United States Patent
Wang et al.

(10) Patent No.: US 11,005,638 B2
(45) Date of Patent: May 11, 2021

(54) COMMUNICATION METHOD, COMMUNICATION APPARATUS AND COMMUNICATION SYSTEM CONFIGURED TO DETERMINE WHETHER A RESERVED PERIOD IS BETWEEN TWO DATA OR SIGNALS

(71) Applicant: Panasonic Intellectual Property Corporation of America, Torrance, CA (US)

(72) Inventors: Lilei Wang, Beijing (CN); Hidetoshi Suzuki, Kanagawa (JP); Ayako Horiuchi, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 114 days.

(21) Appl. No.: 16/322,416

(22) PCT Filed: Sep. 29, 2016

(86) PCT No.: PCT/CN2016/100711
§ 371 (c)(1),
(2) Date: Jan. 31, 2019

(87) PCT Pub. No.: WO2018/058398
PCT Pub. Date: Apr. 5, 2018

(65) Prior Publication Data
US 2019/0199502 A1    Jun. 27, 2019

(51) Int. Cl.
*H04L 5/00* (2006.01)
*H04L 25/02* (2006.01)
(Continued)

(52) U.S. Cl.
CPC .......... *H04L 5/0082* (2013.01); *H04L 5/0007* (2013.01); *H04L 5/0044* (2013.01);
(Continued)

(58) Field of Classification Search
CPC .............. H04L 5/0082; H04L 27/2602; H04L 5/0051; H04L 25/0226; H04L 5/0007;
(Continued)

(56) References Cited

U.S. PATENT DOCUMENTS 10,455,523 B2 * 10/2019 Nishio ................ H04W 52/367
2004/0106425 A1 * 6/2004 Koo .................... H04W 52/143
455/522
(Continued)

OTHER PUBLICATIONS

International Search Report of PCT application No. PCT/CN2016/100711 dated Jun. 21, 2017.

*Primary Examiner* — Hoang-Chuong Q Vu
(74) *Attorney, Agent, or Firm* — Seed IP Law Group LLP

(57) ABSTRACT

There are provided an apparatus, a method and a system. The apparatus comprises: a transmitter operative to transmit wireless data or signals to a second node; and a circuitry operative to determine whether one or more reserved periods are reserved between two continuous data or signals transmitted by the transmitter based on a length of configured transmission time intervals (TTIs), wherein the circuitry is further operative to: determine the one or more reserved periods are reserved between two continuous data or signals in a case that the length of configured TTI is shorter than or equal to a threshold.

20 Claims, 8 Drawing Sheets

(51) Int. Cl.
*H04W 72/04* (2009.01)
*H04L 27/26* (2006.01)

(52) U.S. Cl.
CPC ........ *H04L 5/0051* (2013.01); *H04L 25/0226* (2013.01); *H04L 27/2602* (2013.01); *H04W 72/0446* (2013.01); *H04W 72/0453* (2013.01)

(58) Field of Classification Search
CPC ............ H04L 5/0044; H04W 72/0446; H04W 72/0453
See application file for complete search history.

(56) References Cited

U.S. PATENT DOCUMENTS

| | | | |
|---|---|---|---|
| 2005/0215276 A1* | 9/2005 | Koo .................... | H04W 52/362 455/522 |
| 2006/0176869 A1* | 8/2006 | Cheng ............... | H04W 72/1231 370/345 |
| 2009/0175245 A1* | 7/2009 | Harada ................ | H04L 1/0007 370/336 |
| 2015/0237644 A1* | 8/2015 | Golitschek Edler von Elbwart ................ | H04L 1/1893 370/329 |
| 2016/0080187 A1 | 3/2016 | Yun et al. | |
| 2017/0303182 A1* | 10/2017 | Uchino ................ | H04W 16/12 |
| 2018/0278393 A1* | 9/2018 | Akula .................... | H04L 5/0051 |
| 2018/0302260 A1* | 10/2018 | Li ........................ | H04L 27/2695 |
| 2019/0098626 A1* | 3/2019 | Yi ..................... | H04W 72/0473 |
| 2019/0116611 A1* | 4/2019 | Lee .................. | H04W 72/1278 |
| 2019/0159138 A1* | 5/2019 | Lee .................... | H04W 52/146 |
| 2019/0342838 A1* | 11/2019 | Kwak ................ | H04L 27/2607 |

* cited by examiner

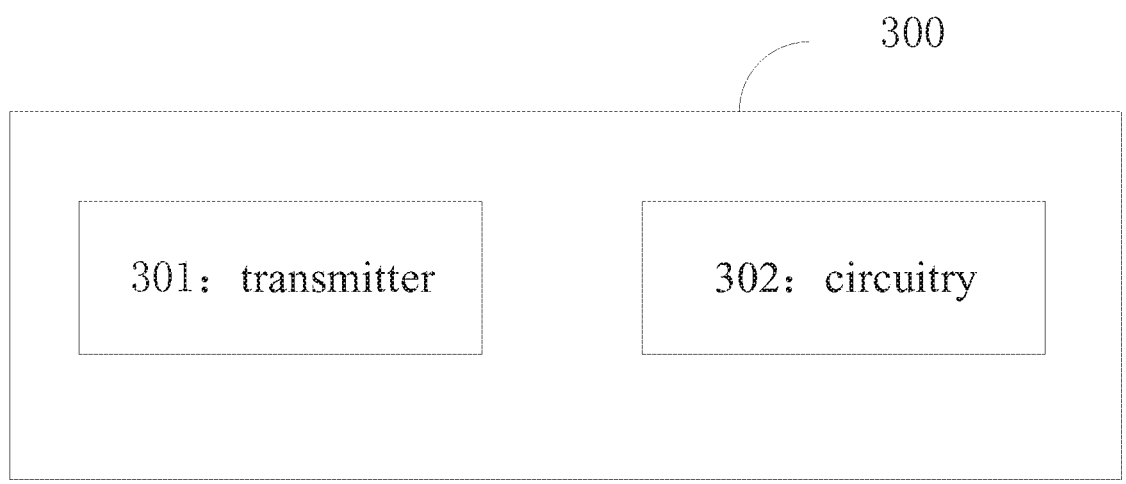
Fig.3
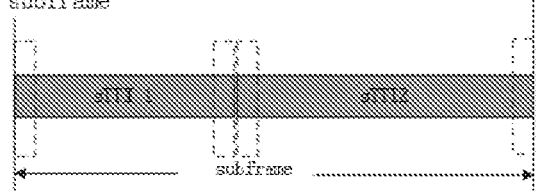
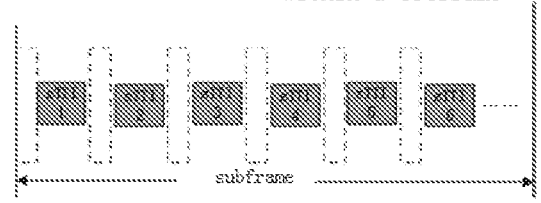
a) Slot-level sTTI    b) 2 symbol-level sTTI
Fig.4A    Fig.4B

COMMUNICATION METHOD, COMMUNICATION APPARATUS AND COMMUNICATION SYSTEM CONFIGURED TO DETERMINE WHETHER A RESERVED PERIOD IS BETWEEN TWO DATA OR SIGNALS

BACKGROUND

1. Technical Field

The present technology relates to wireless communication field, and more particular, to a communication method, communication apparatus and communication system for shortened transmission time intervals (sTTI).

2. Description of the Related Art

In a wireless communication field, end-user radio or wireless terminals, also known as user equipment units (UEs), communicate via a wireless network such as a radio access network (RAN) with a radio base station (RBS), also called "eNodeBs" (eNBs). The radio access network (RAN) covers a geographical area which is divided into cell areas, with each cell area being served by a radio base station.

When a UE or an eNB transmits a signal, it needs a transient time period to make a voltage of the signal from a low level to a high level (or from power off state to power on state), and make a voltage the signal from a high level to a low level (or from power on state to power off state). The signal within transient time period may be unstable, and useless at a receiver, which may be called unwanted or undesired signal.

There is some period, for example 20 us, required for power ON and off based on RAN4 specification TS 36.101. This period is potentially needed for start of a transmission and end of the transmission, as shown in FIG. 1A and FIG. 1B. And depending on the transmission channel type, the transient time needs to be implemented within a subframe (within the period between the timing for starting a subframe and the timing for ending the subframe, as shown in the left 20 us transient period in FIG. 1A) or out of a subframe (out of the period between the timing for starting a subframe and the timing for ending the subframe, as shown in the right 20 us transient period in FIG. 1A). Such transient time of one subframe defined in RAN4 may interfere with other subframe's reception because there would be some unwanted or undesired signal generated during transient time. For subframe length of 1 ms, such impact may be ignored because the transient time just occupies for a small ratio.

However, on the other hand, there is no specific definition or time reserved based on physical layer specification (RAN1). That is, there is no specific transient time reserved within a subframe due to power on and power off for transmitting a signal by a UE or an eNB based on RAN1 standard. From the system or base station perspective, the subframes are continuously transmitted, like FIG. 1C.

There is needed an improved solution for such transient time in RAN1 standard especially for shortened TTI (sTTI) cases.

SUMMARY

The inventors found that no specific time being reserved for the transient time from the physical layer standard may not be problematic for normal TTI because the duration of normal TTI is 1 ms and relatively longer. And the impact of transient time to the transmission/reception may be ignored. Then based on RAN4 specification to define UE's transmitter behavior on transient time is sufficient. But in shortened TTI case (which has a TTI shortened than a threshold which is for example 1 ms), for example, transmitting 2 or 7 orthogonal frequency division multiplexing (OFDM) symbols in a downlink subframe, or transmitting 2, 4, or 7 Single-carrier Frequency-Division Multiple Access (SC-FDMA) symbols in an uplink subframe, such unstable level of the voltage of the transmitted signal from power off to power on or from power on to power off may cause large unwanted or undesired signals at the receiver. In a case of only two OFDM/SC-FDM symbols with smaller subcarrier spacing or 14 symbols with larger subcarrier spacing, the impact of transient time could be larger because the desired signal will be squeezed, as shown in FIG. 2A (upper part). In addition, assuming that the transient time is reserved for both start and end of a shortened TTI (sTTI) and 20 us is needed for each transient time, the ratio of transient time is as following table 1. It is clear from that table 1 that especially for 2 symbol sTTI case, the ratio of transient time over a sTTI is around 30% which is quite large and may heavily impact performance of desired signal reception.

TABLE 1

|  | 7 symbol sTTI | 4 symbol sTTI | 2 symbol sTTI |
| --- | --- | --- | --- |
| Ratio of transient time over a sTTI | (20 + 20)/ 500 = 8% | (20 + 20)/ 250 = 16% | (20 + 20)/ 143 = 30% |

But on the other hand, if the transient time is arranged out of the sTTI, it may interfere with other sTTI as shown in FIG. 2B, namely sTTI 1's transient time will impact reception of sTTI 2's signal and vice versa. The impact of transient time is heavier for very shortened sTTI cases. Here the shortened sTTI may be realized by reducing transmitted OFDM/SC-FDMA symbols or increasing subcarrier spacing. In case of the latter one, OFDM symbol number of TTI is still for example 14, which is same as that of normal TTI.

Based on the above observation and analysis, the inventors propose an improved solution for such transient time in RAN1 standard especially for shortened TTI (sTTI) cases.

In one general aspect, there is provided an apparatus, at a first node, comprising: a transmitter operative to transmit wireless data or signals to a second node; and a circuitry operative to determine whether one or more reserved periods are reserved between two continuous data or signals transmitted by the transmitter based on a length of configured transmission time intervals (TTIs), wherein the circuitry is further operative to: determine the one or more reserved periods are reserved between two continuous data or signals in a case that the length of configured TTI is shorter than or equal to a threshold.

In another general aspect, there is provided a method, performed at a first node, comprising steps of: transmitting wireless data or signals to a second node; and determining whether one or more reserved periods are reserved between two continuous data or signals transmitted by the transmitter based on a length of configured transmission time intervals (TTIs), wherein the step of determining further includes: determining the one or more reserved periods are reserved between two continuous data or signals in a case that the length of configured TTI is shorter than or equal to a threshold.

In another general aspect, there is provided a communication system, performed at a first node, comprising: one or more processors; a memory coupled with the one or more processors, storing computer programs therein, when executed by the one or more processors, to perform steps of: transmitting wireless data or signals to a second node; and determining whether one or more reserved periods are reserved between two continuous data or signals transmitted by the transmitter based on a length of configured transmission time intervals (TTIs), wherein the step of determining further includes: determining the one or more reserved periods are reserved between two continuous data or signals in a case that the length of configured TTI is shorter than or equal to a threshold.

BRIEF DESCRIPTION OF DRAWINGS

FIG. 3 schematically shows a block diagram of an apparatus at a first node according to an embodiment of the invention.

FIG. 4A and FIG. 4B schematically show a transient time configuration according to different lengths of sTTIs according to an embodiment of the invention.

DETAILED DESCRIPTION

Figure 1A:
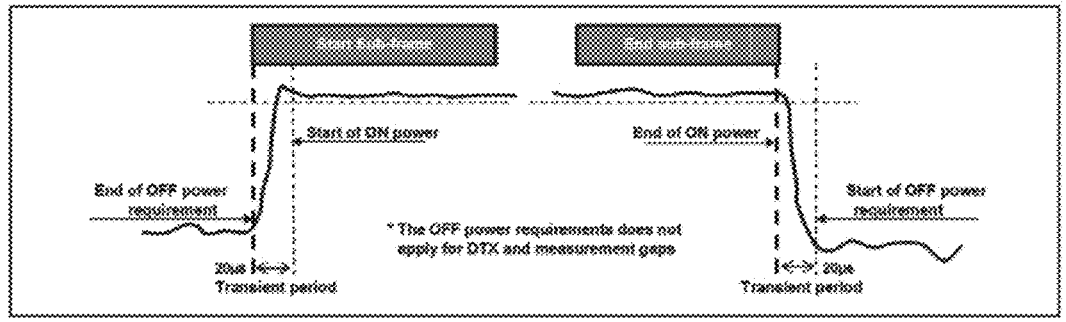
FIG. 1A schematically shows a concept of transient period in one subframe specified in RAN4 specification of 3GPP TS 36.211.
Figure 1B:
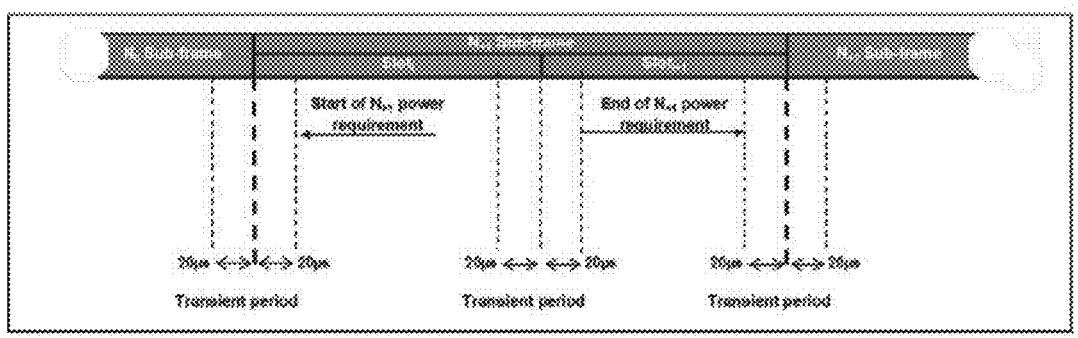
FIG. 1B schematically shows a concept of transient period in multiple subframes specified in RAN4 specification of 3GPP TS 36.211.

Embodiments will now be described with reference to FIGS. 3 through 11, which relate to a communication method, apparatus and system. It is understood that the present technology may be embodied in many different forms and in many different orders and should not be construed as being limited to the embodiments set forth herein. Rather, these embodiments are provided so that this disclosure will be thorough and complete and will fully convey the present technology to those skilled in the art. Indeed, the present technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

While orders of the steps of the methods and the structures of the components are provided herein for exemplary purposes, but not for limitation. The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

FIG. 3 schematically shows a block diagram of an apparatus 300 at a first node according to an embodiment of the invention.

The apparatus 300, at a first node, comprises: a transmitter 301 operative to transmit wireless data or signals to a second node; and a circuitry 302 operative to determine whether one or more reserved periods are reserved between two continuous data or signals transmitted by the transmitter based on a length of configured transmission time intervals (TTIs). The circuitry 302 is further operative to: determine the one or more reserved periods are reserved between two continuous data or signals in a case that the length of configured TTI is shorter than or equal to a threshold.

Thus, in RAN1 specification, in a case that the length of configured TTI is shorter than or equal to a threshold, the one or more reserved periods are reserved between two continuous data or signals, and resource utilization can be optimized for different lengths of sTTIs.

FIG. 4A and FIG. 4B schematically show a transient time configuration according to different lengths of sTTIs according to an embodiment of the invention.

As shown in the FIG. 4A, no specific time being reserved for the transient time (for example 2 symbols in a subframe and one symbol is for start transient time and one symbol for end transient time) for slot-level TTI from the physical layer standard may not be problematic, because the duration of slot-level TTI is relatively longer. So, for the TTI longer than or equal to a threshold (for example, 500 us equals to 7 OFDM symbols), no reserved periods are reserved between two continuous data or signals.

As shown in FIG. 4B, for the TTI shorter than a threshold (for example, 500 us equals to 7 OFDM symbols), namely 2 OFDM symbols are assumed, reserved periods are reserved between two continuous data or signals.

To be noted that the TTI concept may include a normal TTI with for example, 1 ms assuming 15 khz subcarrier spacing (for example, specified in 3 GPP TS 36.211, release 8-12), and a shortened TTI with a shortened length shorter than the length of a normal TTI, and any TTI with any length. But the concept of the shortened TTI with a shortened length shorter than the length of the normal TTI is not definitely equal to the concept of the TTI shorter than or equal to a threshold defined in this disclosure, because the threshold may be shorter than or longer than or equal to the length of the normal TTI. In order to make the solution more comprehensive, the shortened TTI with a shortened length shorter than the length of the normal TTI is usually called sTTI for short, but not for limitation, because the shortened TTI still belong to a kind of TTI.

The following table 2 schematically shows an example to show the transient time configuration to different lengths of sTTI according to the embodiment. As shown in table 2, in the embodiment, the impact of transient time for 7-symbol sTTI is around 8% assuming one transient time is needed for start of a sTTI and one transient time is needed for end of a sTTI. The transient time is within the sTTI. The impact of transient time to 4-symbol sTTI without hopping is around 16% and such value is around 28% for 4 symbol sTTI with hopping and 2-symbol sTTI. So based on such analysis, no specific reserved time period should be reserved for 7 symbol sTTI and 4 symbol sTTI without hopping within a subframe. FIG. 4 also shows the example of 7 symbol sTTI. The transient time is implemented by UE based on RAN4 requirement. But for 2 symbol sTTI case, It may interfere with other UE or transmission in another subframe, or impact its own transmission, there should be specific time reserved for the future transient time specified in RAN4, which causes two sTTIs not adjacent in time domain from the base station or system perspective.

TABLE 2

Transient time configuration to different sTTI

| | 7 symbol TTI | 4 symbol TTI without hopping | 4 symbol TTI with hopping (assuming 2-2 symbol hopping structure) | 2 symbol TTI |
|---|---|---|---|---|
| Whether one or multiple reserved period is specially reserved within a subframe | No | No | Yes | Yes |
| Motivation | Transient time has less impact on 7 symbol TTI: 40 us/ 500 us = 8% | Transient time has less impact on 4 symbol TTI: 40 us/ 250 us = 16% | Transient time has larger impact on 4 symbol TTI with hopping: 40 us/ 143 us = 28% | Transient time has larger impact on 2 symbol TTI: 40 us/ 143 us = 28% |

Figure 1C:
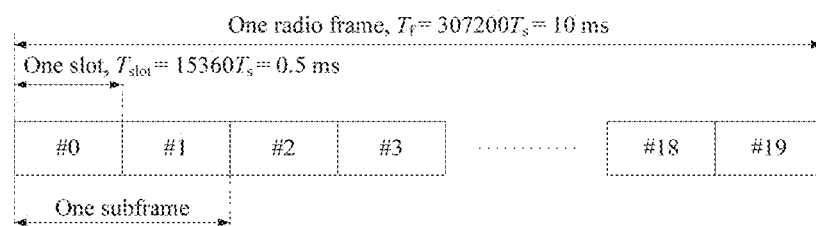
FIG. 1C schematically shows subframes which are continuously transmitted from the system or base station perspective.
Figure 2A:
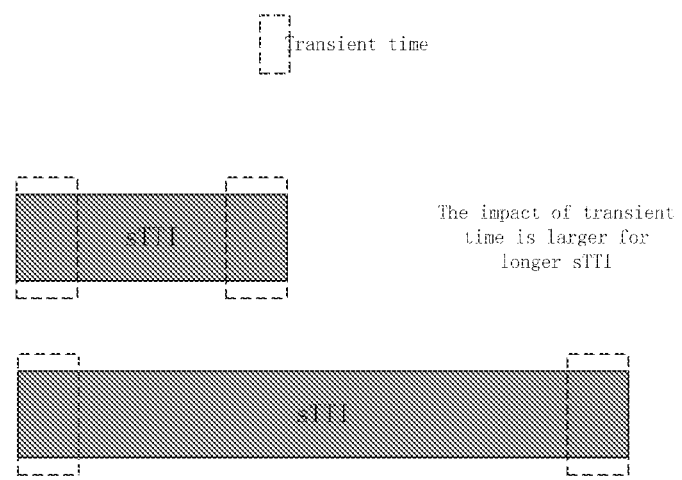
FIG. 2A schematically shows a transient time impact according to different lengths of sTTIs if the transient time is within a sTTI.
Figure 2B:
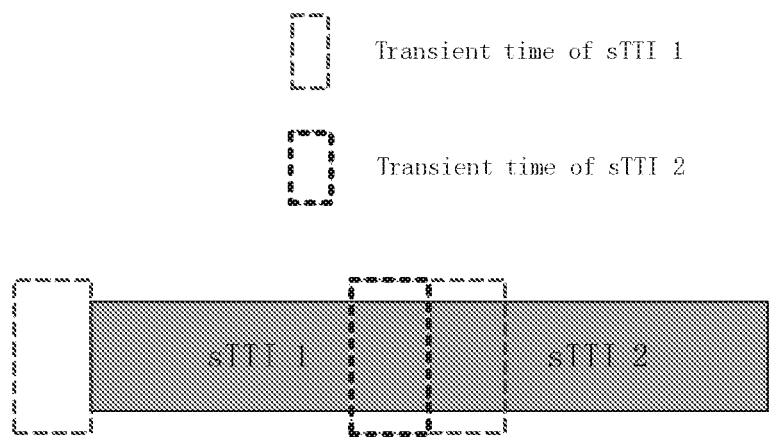
FIG. 2B schematically shows a sTTI's transient time impact on a subsequent sTTI if the transient time is out of a sTTI.

To be noted that the "transient time" concept herein normally denotes a specific time defined in RAN4 for the transmitter to transmit signals, but the "reserved time/period" concept herein normally denotes a specific time reserved between two sTTIs from system perspective from the physical layer standard. In RAN4, the transient time reservation is realized by the UE, and is different for different UE. In RAN1 specification, there is no any handling on transient time/period or eNB/UE assumes continuous transmission of two TTIs or subframes as shown in FIG. 1C.

In an embodiment, the circuitry 302 is further operative to: determine whether one or more reserved periods are reserved between the two continuous data or signals based on at least one of types of the two continuous data or signals and power difference between the two continuous data or signals.

In an embodiment, the circuitry 302 is further operative to: determine that one or more reserved periods are reserved between the two continuous data or signals, if the types of the two continuous data or signals are different; determine that one or more reserved periods are not reserved between the two continuous data or signals, if there is no power difference between the two continuous data or signals; or determine that one or more reserved periods are not reserved between the two continuous data or signals, if the types of the two continuous data or signals are different and there is no power difference between the two continuous data or signals.

This embodiment may include at least three ways in which:

(1) one or more reserved periods are reserved between the two continuous data or signals, if the types of the two continuous data or signals are different, no matter whether there is power difference between the two continuous data or signals; this way is efficient, because only one determination on whether the types of the two continuous data or signals are different is performed, and transmitting two different types of data (such as SRS signal and the user data) normally has different power for transmission;

(2) one or more reserved periods are not reserved between the two continuous data or signals, if there is no power difference between the two continuous data or signals, no matter whether the types of the two continuous data or signals are different; in this case, if no power difference occurs between the two continuous data or signals, then there is no need to change the power from ON to OFF (or from high to low) or from OFF to ON (or from high to low), so it is not necessary to reserve one or more reserved periods between the two continuous data or signals, thereby, the resource utilization can be optimized;

(3) one or more reserved periods are not reserved between the two continuous data or signals, if the types of the two continuous data or signals are different and there is no power difference between the two continuous data or signals; in a case, two conditions should be both satisfied: first, the types of the two continuous data or signals are different, and second, there is no power difference between the two continuous data or signals. The cases that there is no power difference between the two continuous data or signals when the types of the two continuous data or signals are different are very few. However, once there is no power difference between the two continuous data or signals, it is not necessary to reserve one or more reserved periods between the two continuous data or signals, thereby, the resource utilization can be optimized.

Figure 5A:
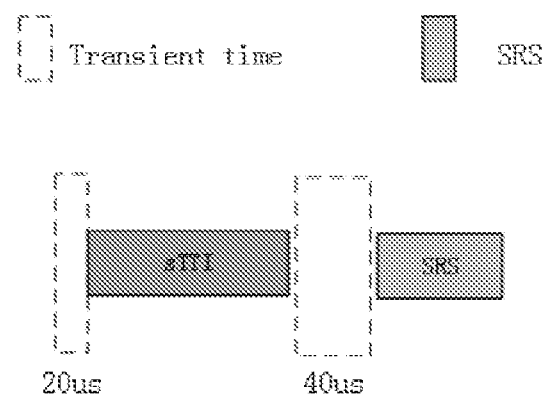
FIG. 5A schematically shows a transient time configuration according to different channel types according to an embodiment of the invention.
Figure 5B:
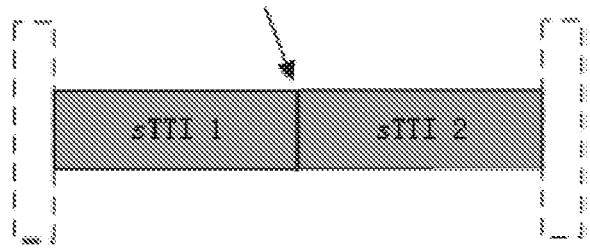
FIG. 5B schematically shows a transient time configuration according to different channel types according to the embodiment of the invention.

FIG. 5A schematically shows a transient time configuration according to different channel types according to an embodiment of the invention. FIG. 5B schematically shows a transient time configuration according to different channel types according to the embodiment of the invention. The two drawings show the above mentioned first way in which: (1) one or more reserved periods are reserved between the two continuous data or signals, if the types of the two continuous data or signals are different. As shown in FIG. 5A, 40 us reserved periods are reserved between the two continuous data or signals, since the types of the two continuous data or signals (the user data (sTTI) and the SRS type data) are different. As shown in FIG. 5B, no reserved period is reserved between the two continuous data or signals, since the types of the two continuous data or signals (both the user data (sTTIs) from the same UE) are the same. In this case, the reason is that the user data and SRS would have different power, but the power between two sTTIs from the same UE could have no difference. So, resource utilization is improved as no resource is wasted for the transient time.

Figure 6A:
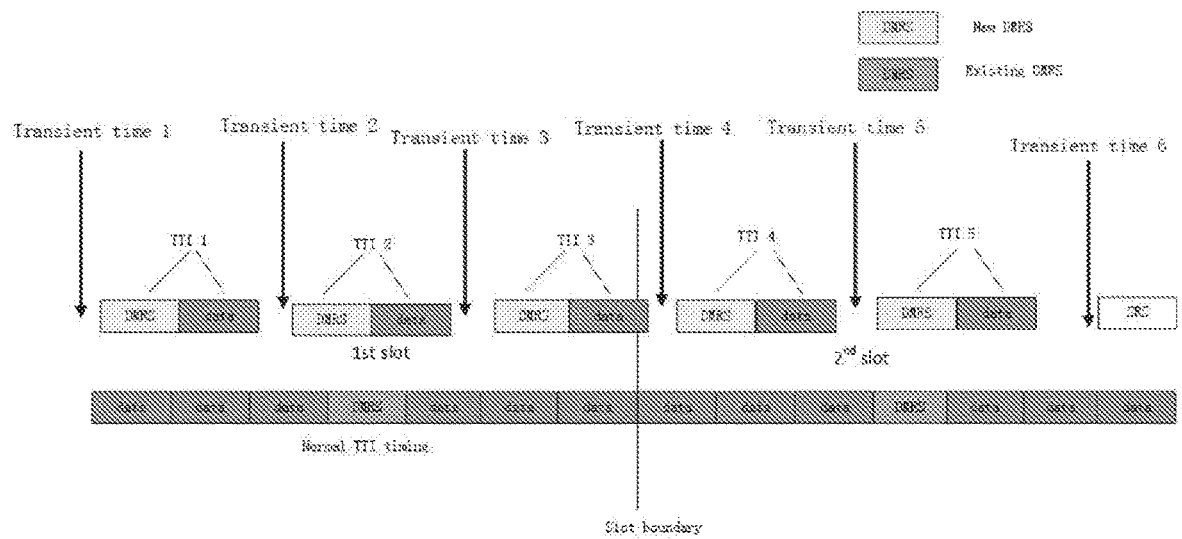
FIG. 6A schematically shows a transient time not aligned with symbol/slot boundary of normal TTI according to an embodiment of the invention.

FIG. 6A schematically shows a transient time not aligned with symbol/slot boundary of normal TTI according to an embodiment of the invention.

In an embodiment, the circuitry 302 is further operative to: in a case that the one or more reserved periods are reserved between two continuous data or signals, not align Orthogonal Frequency Division Multiplexing (OFDM) or Single-carrier Frequency-Division Multiple Access (SC-FDMA) symbol boundary of each of the two continuous data or signals with that of the other data or signals which have a length of TTI equaling to or longer than the threshold, as shown in FIG. 6A.

FIG. 6A shows an example that the sTTI is not aligned with legacy symbol or slot boundary within a subframe due to the introduction of the transient time. Multiple transient times are reserved between two sTTIs within a subframe. Here, it is assumed that one sTTI consists of one symbol transmitting DMRS and one symbol transmitting data. The sTTIs are arranged as much as possible within a subframe based on the minimum requirement of RAN4. In this example, a maximum of 5 sTTIs could be arranged with a subframe. By doing so, sTTI resources could be optimized.

Figure 6B:
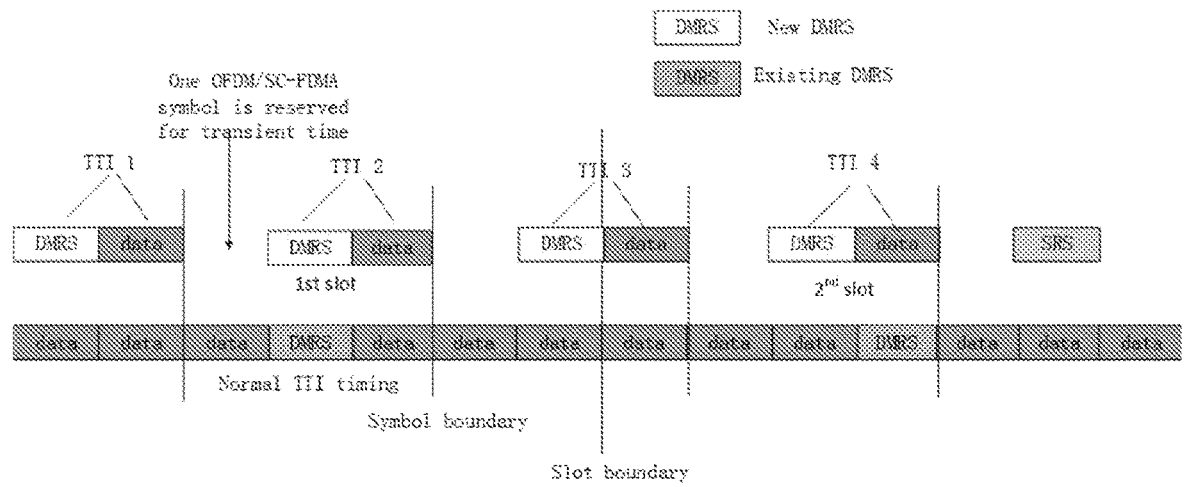
FIG. 6B schematically shows a transient time aligned with symbol/slot boundary of normal TTI according to another embodiment of the invention.

FIG. 6B schematically shows a transient time aligned with symbol/slot boundary of normal TTI according to another embodiment of the invention.

In an embodiment, the circuitry 302 is further operative to: in a case that the one or more reserved periods are reserved between two data or signals, align OFDM or SC-FDMA symbol boundary of each of the two continuous data or signals with that of the other data or signals which have a length of TTI equaling to or longer than the threshold, as show in FIG. 6B.

FIG. 6B shows an example that the sTTI is exactly aligned with legacy symbol or slot boundary within a subframe due to introduction of the transient time. In an embodiment, the circuitry 302 is further operative to: reserve one OFDM or SC-FDMA symbol for the reserved period between the two continuous data or signals. As shown in FIG. 6B, one OFDM or SC-FDMA symbol is used for transient time and there is no interference with each other between two adjacent sTTIs. As the symbol is aligned, inter-carrier interference and UE complexity may be minimized, considering some normal TTIs may be multiplexed with sTTIs in frequency domain in the same subframe, however, the resource utilization may not be optimized, since there are only four sTTIs arranged with a subframe compared with the case of FIG. 6A.

Figure 7:
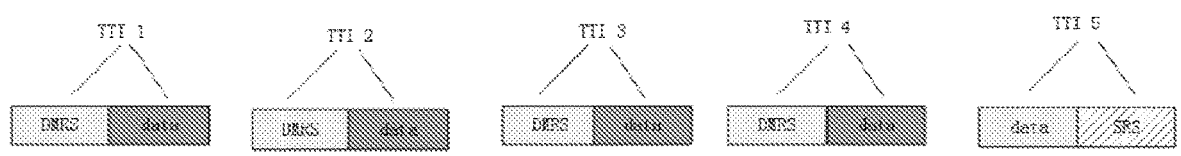
FIG. 7 schematically shows a transient time configuration in which a sounding reference signal (SRS) in a sTTI is used for demodulating according to an embodiment of the invention.

FIG. 7 schematically shows a transient time configuration in which a sounding reference signal (SRS) in a sTTI is used for demodulating according to an embodiment of the invention.

In an embodiment, the transmitter 301 is operative to: in a case that the one data or signal of the two continuous data or signals include a sounding reference signal (SRS), transmit user data in the one data or signal without transmitting a demodulation reference Signal (DMRS) in the one data or signal.

FIG. 7 shows one example that SRS signal could be used for demodulating sTTI. In a subframe, when UE transmits SRS, the adjacent sTTI will not transmit DMRS. SRS will be used for demodulation. Such behavior is beneficial to reduce RS overhead. But as not every subframe or PRB will transmit SRS, which PRB or subframe uses SRS for demodulation depends on SRS configuration.

Figure 8:
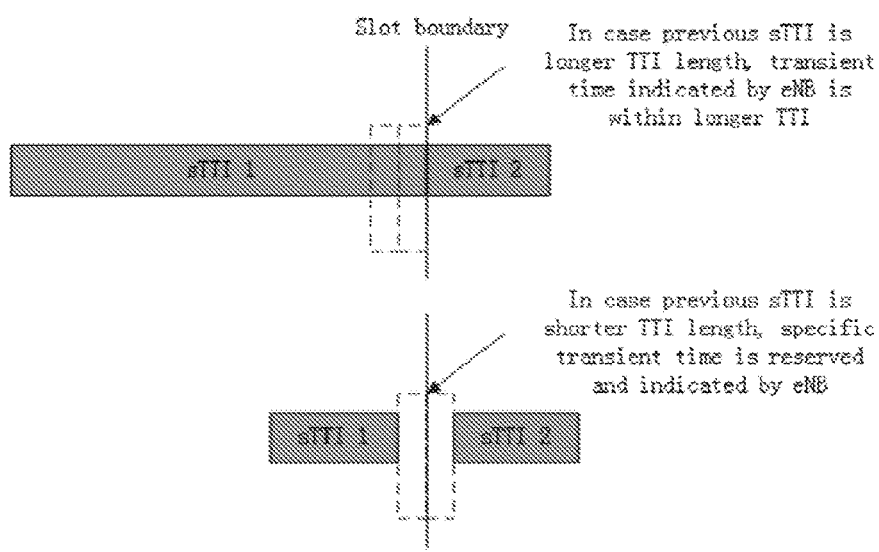
FIG. 8 schematically shows a transient time configuration in which the start time of a transmission or transient time is controlled by eNB, according to another embodiment of the invention.

FIG. 8 schematically shows a transient time configuration in which the start time of a transmission or transient time is controlled by eNB, according to another embodiment of the invention.

In an embodiment, the circuitry 302 is further operative to: make an eNodeB (eNB) to indicate at least one of start time of at least one of the reserved periods and start time of at least one of data or signals. Thus, the reserved period configuration can be configured by the eNB.

FIG. 8 shows one example that eNB indicates the reserved time of a UE. In a case that the previous sTTI (sTTI 1) has longer length, the reserved time of sTTI 2 could be within sTTI 1 considering that the impact on sTTI 1 is smaller. The eNB could indicate the reserved time or start time of a transport block (TB) by certain signalling (e.g., Downlink Control Information (DCI) in Physical Downlink Control Channel (PDCCH) or Enhanced Physical Downlink Control Channel (EPDCCH)). Another possibility is that the eNB controls the start time of a transmission or transient time by timing advance indication.

In a case that the previous sTTI's length (sTTI 1) is smaller, the reserved time of sTTI 2 is not within any sTTI. The reserved time or start time of transmission is indicated by eNB. By doing so, it could avoid interference to each other.

In an embodiment, the circuitry 302 is further operative to: reserve the reserved period which does not overlap with a reference signal (RS) symbol.

In an embodiment, the circuitry 302 is further operative to perform at least one of the following steps, in a case that the length of each TTI is shorter than or equal to a threshold: setting the one or more reserved periods in which no wanted or desired data or signal is transmitted between continuous data or signals; setting the one or more reserved periods in which no wanted or desired data or signal is transmitted before transmitting subsequent data or signals; and setting the one or more reserved periods in which no wanted or desired data or signal is transmitted after transmitting subsequent data or signals.

That is, reserving a reserved period in this disclosure means setting the one or more reserved periods in which no wanted or desired data or signal is transmitted between continuous data or signals, before transmitting subsequent data or signals and after transmitting subsequent data or signals. Therefore, inter-subcarrier interference can be reduced.

In an embodiment, the wanted or desired data or signal may be data or signal whose transmission power level is higher than a predetermined requirement.

In an embodiment, the two continuous data or signals may include at least one of a sounding reference signal (SRS), a demodulation reference Signal (DMRS) of a TTI, and user data of a TTI.

In an embodiment, the configured TTI includes at least one of a shortened TTI within a subframe and a TTI across one or more subframes.

Figure 9A:
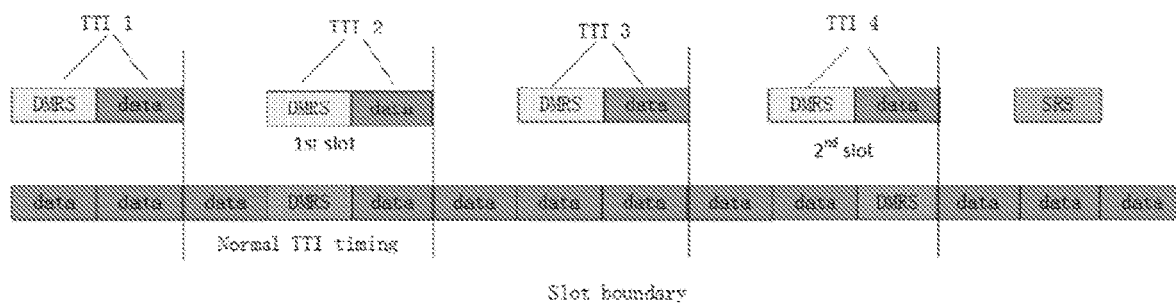
FIG. 9 schematically shows a transient time configuration for four symbol sTTIs with hopping, according to another embodiment of the invention.
Figure 9B:
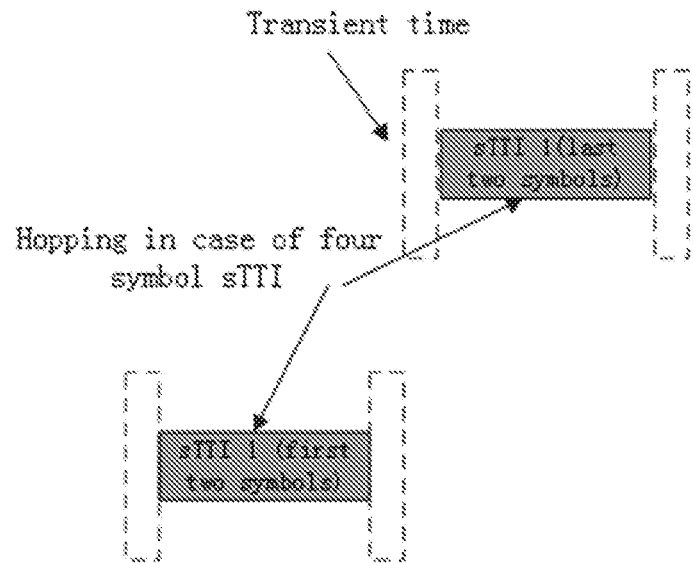

FIG. 9A and FIG. 9B schematically show a transient time configuration for four symbol sTTIs with hopping, according to another embodiment of the invention.

The four symbol sTTIs with hopping means that the first two symbols are transmitted first, and the last two symbols are then transmitted. FIG. 9A and FIG. 9B shows an example on four symbol sTTI with hopping case as shown in FIG. 9A. Basically in this case, the four symbol sTTI could reuse two-symbol sTTI time pattern; for example, the TTI 1 transmits the first two symbols of four-symbol sTTI and the TTI 2 transmits the last two symbols of four-symbol sTTI, but the first two symbols are in different physical resource blocks (PRBs) from the last two symbols as shown in FIG. 9B.

Thus, with the embodiments of the invention, resource utilization can be optimized, and inter-subcarrier interference can be reduced.

Figure 10:
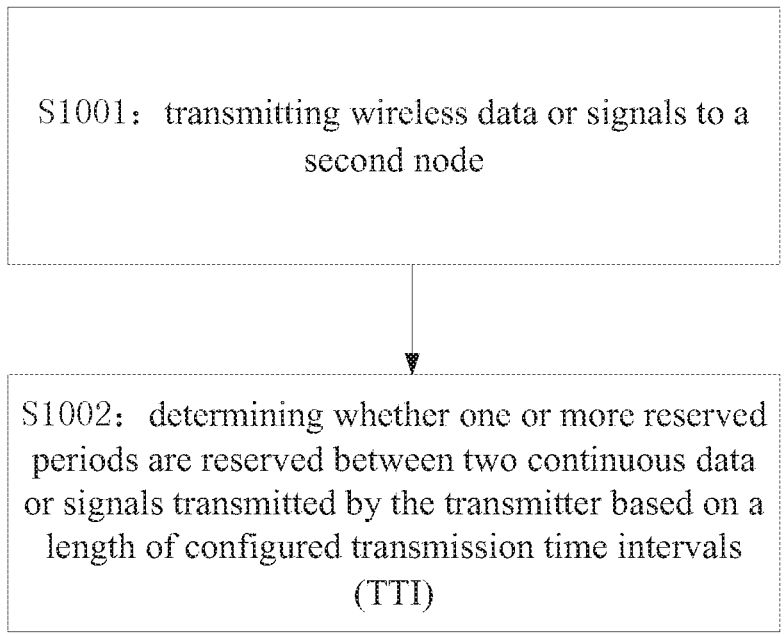
FIG. 10 schematically shows a flow chart of a method at a first node according to an embodiment of the invention.

FIG. 10 schematically shows a flow chart of a method 1000 at a first node according to an embodiment of the invention.

The method 1000 performed at a first node, comprising steps of: step S1001, transmitting wireless data or signals to a second node; and step S1002, determining whether one or more reserved periods are reserved between two continuous data or signals transmitted by the transmitter based on a length of configured transmission time intervals (TTIs), wherein the step S1002 of determining further includes: determining the one or more reserved periods are reserved between two continuous data or signals in a case that the length of configured TTI is shorter than or equal to a threshold.

In an embodiment, the step S1002 of determining further includes: determining whether one or more reserved periods are reserved between the two continuous data or signals based on at least one of types of the two continuous data or signals and power difference between the two continuous data or signals.

In an embodiment, the step S1002 of determining further includes: determining that one or more reserved periods are reserved between the two continuous data or signals, if the types of the two continuous data or signals are different; determining that one or more reserved periods are not reserved between the two continuous data or signals, if there is no power difference between the two continuous data or signals; or determining that one or more reserved periods are not reserved between the two continuous data or signals, if the types of the two continuous data or signals are different and there is no power difference between the two continuous data or signals.

In an embodiment, the step S1002 of determining further includes: in a case that the one or more reserved periods are reserved between two continuous data or signals, the symbol of the two continuous data or signals is not aligned with that of the other data or signals which have a length of sTTI is longer than or equal to the threshold.

In an embodiment, the step S1002 of determining further includes: in a case that the one or more reserved periods are reserved between two continuous data or signals, not aligning Orthogonal Frequency Division Multiplexing (OFDM) or Single-carrier Frequency-Division Multiple Access (SC-FDMA) symbol boundary of each of the two continuous data or signals with that of the other data or signals which have a length of TTI equaling to or longer than the threshold.

In an embodiment, the step S1002 of determining further includes: reserving one OFDM or SC-FDMA symbol for the reserved period between the two continuous data or signals.

In an embodiment, the step S1001 of transmitting further includes: in a case that the one data or signal of the two continuous data or signals include a sounding reference signal (SRS), transmit user data in the one data or signal without transmitting a demodulation reference Signal (DMRS) in the one data or signal.

In an embodiment, the method 1000 further includes: making an eNodeB (eNB) to indicate at least one of start time of at least one of the reserved periods and start time of at least one of data or signals.

In an embodiment, the step S1002 of determining further includes: reserving the reserved period which does not overlap with a reference signal (RS) symbol.

In an embodiment the step S1002 of determining further includes performing at least one of the following steps, in a case that the length of each TTI is shorter than or equal to a threshold: setting the one or more reserved periods in which no wanted or desired data or signal is transmitted between continuous data or signals; setting the one or more reserved periods in which no wanted or desired data or signal is transmitted before transmitting subsequent data or signals; and setting the one or more reserved periods in which no wanted or desired data or signal is transmitted after transmitting subsequent data or signals.

In an embodiment, the wanted or desired data or signal is data or signal whose transmission power level is higher than a predetermined requirement.

In an embodiment, the two continuous data or signals include at least one of a sounding reference signal (SRS), a demodulation reference Signal (DMRS) of a TTI, and user data of a TTI.

In an embodiment, the configured TTI includes at least one of a shortened TTI within a subframe and a TTI across one or more subframes.

Thus, with the embodiments of the invention, resource utilization can be optimized, and inter-subcarrier interference can be reduced.

To be noted that the method may perform additional actions and steps by the apparatus as above mentioned, so such additional actions and steps are not described here to avoid redundancy.

Figure 11:
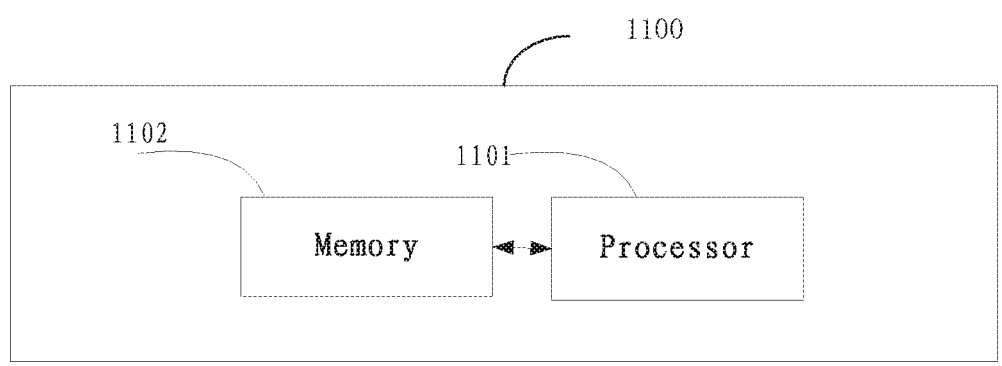
FIG. 11 schematically shows a block diagram of a system according to an embodiment of the invention.

FIG. 11 schematically shows a block diagram of a system 1100 according to an embodiment of the invention.

The communication system 1100, performed at a first node, comprises: one or more processors 1101; a memory 1102 coupled with the one or more processors, storing computer programs therein, when executed by the one or more processors, to perform steps of: transmitting wireless data or signals to a second node; and determining whether one or more reserved periods are reserved between two continuous data or signals transmitted by the transmitter based on a length of configured transmission time intervals (TTIs), wherein the step of determining further includes: determining the one or more reserved periods are reserved between two continuous data or signals in a case that the length of configured TTI is shorter than or equal to a threshold.

To be noted that the computer programs therein, when executed by the one or more processors, can perform steps as above mentioned, so the detailed description is omitted herein.

Thus, with the embodiments of the invention, resource utilization can be optimized, and inter-subcarrier interference can be reduced.

In addition, embodiments of the present disclosure can at least provide the following subject matters.

(1) An apparatus, at a first node, comprising:
a transmitter operative to transmit wireless data or signals to a second node; and
a circuitry operative to determine whether one or more reserved periods are reserved between two continuous data or signals transmitted by the transmitter based on a length of configured transmission time intervals (TTIs),
wherein the circuitry is further operative to:
determine the one or more reserved periods are reserved between two continuous data or signals in a case that the length of configured TTI is shorter than or equal to a threshold.

(2) The apparatus according to (1), wherein, the circuitry is further operative to:
determine whether one or more reserved periods are reserved between the two continuous data or signals based on at least one of types of the two continuous data or signals and power difference between the two continuous data or signals.

(3) The apparatus according to (2), wherein, the circuitry is further operative to:
determine that one or more reserved periods are reserved between the two continuous data or signals, if the types of the two continuous data or signals are different;
determine that one or more reserved periods are not reserved between the two continuous data or signals, if there is no power difference between the two continuous data or signals; or
determine that one or more reserved periods are not reserved between the two continuous data or signals, if the types of the two continuous data or signals are different and there is no power difference between the two continuous data or signals.

(4) The apparatus according to (1), wherein, the circuitry is further operative to:
in a case that the one or more reserved periods are reserved between two continuous data or signals, not align Orthogonal Frequency Division Multiplexing (OFDM) or Single-carrier Frequency-Division Multiple Access (SC-FDMA) symbol boundary of each of the two continuous data or signals with that of the other data or signals which have a length of TTI equaling to or longer than the threshold.

(5) The apparatus according to (1), wherein, the circuitry is further operative to:
in a case that the one or more reserved periods are reserved between two data or signals, align OFDM or SC-FDMA symbol boundary of each of the two continuous data or signals with that of the other data or signals which have a length of TTI equaling to or longer than the threshold.

(6) The apparatus according to (5), wherein, the circuitry is further operative to:
reserve one OFDM or SC-FDMA symbol for the reserved period between the two continuous data or signals.

(7) The apparatus according to (1), wherein, the transmitter is operative to:
in a case that the one data or signal of the two continuous data or signals include a sounding reference signal (SRS), transmit user data in the one data or signal without transmitting a demodulation reference Signal (DMRS) in the one data or signal.

(8) The apparatus according to (1), wherein, the circuitry is further operative to:
make an eNodeB (eNB) to indicate at least one of start time of at least one of the reserved periods and start time of at least one of data or signals.

(9) The apparatus according to (1), wherein, the circuitry is further operative to:
reserve the reserved period which does not overlap with a reference signal (RS) symbol.

(10) The apparatus according to (1), wherein the circuitry is further operative to perform at least one of the following steps, in a case that the length of each TTI is shorter than or equal to a threshold:
setting the one or more reserved periods in which no wanted or desired data or signal is transmitted between continuous data or signals;
setting the one or more reserved periods in which no wanted or desired data or signal is transmitted before transmitting subsequent data or signals; and
setting the one or more reserved periods in which no wanted or desired data or signal is transmitted after transmitting subsequent data or signals.

(11) The apparatus according to (10), wherein the wanted or desired data or signal is data or signal whose transmission power level is higher than a predetermined requirement.

(12) The apparatus according to (1), wherein the two continuous data or signals include at least one of a sounding reference signal (SRS), a demodulation reference Signal (DMRS) of a TTI, and user data of a TTI.

(13) The apparatus according to (1), wherein the configured TTI includes at least one of a shortened TTI within a subframe and a TTI across one or more subframes.

(14) A method, performed at a first node, comprising steps of:
transmitting wireless data or signals to a second node; and
determining whether one or more reserved periods are reserved between two continuous data or signals transmitted by the transmitter based on a length of configured transmission time intervals (TTIs),
wherein the step of determining further includes:
determining the one or more reserved periods are reserved between two continuous data or signals in a case that the length of configured TTI is shorter than or equal to a threshold.

(15) The method according to (14), wherein, the step of determining further includes:
determining whether one or more reserved periods are reserved between the two continuous data or signals based on at least one of types of the two continuous data or signals and power difference between the two continuous data or signals.

(16) The method according to (15), wherein, the step of determining further includes:
determining that one or more reserved periods are reserved between the two continuous data or signals, if the types of the two continuous data or signals are different;
determining that one or more reserved periods are not reserved between the two continuous data or signals, if there is no power difference between the two continuous data or signals; or
determining that one or more reserved periods are not reserved between the two continuous data or signals, if the types of the two continuous data or signals are different and there is no power difference between the two continuous data or signals.

(17) The method according to (14), wherein, the step of determining further includes:
in a case that the one or more reserved periods are reserved between two continuous data or signals, the symbol of the two continuous data or signals is not aligned with that of the other data or signals which have a length of sTTI is longer than or equal to the threshold.

(18) The method according to (14), wherein, the step of determining further includes:

in a case that the one or more reserved periods are reserved between two continuous data or signals, not aligning Orthogonal Frequency Division Multiplexing (OFDM) or Single-carrier Frequency-Division Multiple Access (SC-FDMA) symbol boundary of each of the two continuous data or signals with that of the other data or signals which have a length of TTI equaling to or longer than the threshold.

(19) The method according to (18), wherein, the step of determining further includes:

reserving one OFDM or SC-FDMA symbol for the reserved period between the two continuous data or signals.

(20) The method according to (14), wherein, the step of transmitting further includes:

in a case that the one data or signal of the two continuous data or signals include a sounding reference signal (SRS), transmit user data in the one data or signal without transmitting a demodulation reference Signal (DMRS) in the one data or signal.

(21) The method according to (14), wherein, the method further includes:

making an eNodeB (eNB) to indicate at least one of start time of at least one of the reserved periods and start time of at least one of data or signals.

(22) The method according to (14), wherein, the step of determining further includes:

reserving the reserved period which does not overlap with a reference signal (RS) symbol.

(23) The method according to (14), wherein the step of determining further includes performing at least one of the following steps, in a case that the length of each TTI is shorter than or equal to a threshold:

setting the one or more reserved periods in which no wanted or desired data or signal is transmitted between continuous data or signals;

setting the one or more reserved periods in which no wanted or desired data or signal is transmitted before transmitting subsequent data or signals; and setting the one or more reserved periods in which no wanted or desired data or signal is transmitted after transmitting subsequent data or signals.

(24) The method according to (23), wherein the wanted or desired data or signal is data or signal whose transmission power level is higher than a predetermined requirement.

(25) The method according to (14), wherein the two continuous data or signals include at least one of a sounding reference signal (SRS), a demodulation reference Signal (DMRS) of a TTI, and user data of a TTI.

(26) The method according to (14), wherein the configured TTI includes at least one of a shortened TTI within a subframe and a TTI across one or more subframes.

(27) A communication system, performed at a first node, comprising one or more processors;

a memory coupled with the one or more processors, storing computer programs therein, when executed by the one or more processors, to perform steps of:

transmitting wireless data or signals to a second node; and determining whether one or more reserved periods are reserved between two continuous data or signals transmitted by the transmitter based on a length of configured transmission time intervals (TTIs), wherein the step of determining further includes:

determining the one or more reserved periods are reserved between two continuous data or signals in a case that the length of configured TTI is shorter than or equal to a threshold.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Examples of several embodiments of the present disclosure have been described in detail above, with reference to the attached illustrations of specific embodiments. Because it is not possible, of course, to describe every conceivable combination of components or techniques, those skilled in the art will appreciate that various modifications may be made to the above described embodiments without departing from the scope of the present disclosure. For example, it will be readily appreciated that although the above embodiments are described with reference to parts of a 3GPP network, an embodiment of the present disclosure will also be applicable to like networks, such as a successor of the 3GPP network, having like functional components.

Therefore, in particular, the terms 3GPP and associated or related terms used in the above description and in the enclosed drawings and any appended claims now or in the future are to be interpreted accordingly.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Notably, modifications and other embodiments of the disclosed disclosure(s) will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. An apparatus, at a first node, comprising:
a transmitter operative to transmit wireless data or signals to a second node; and
a circuitry operative to determine whether one or more reserved periods are reserved between two continuous data or signals transmitted by the transmitter based on a length of configured transmission time intervals (TTIs),
wherein the circuitry is further operative to:
determine the one or more reserved periods are reserved between two continuous data or signals in a case that the length of the configured TTIs is shorter than or equal to a threshold, and
determine no reserved period is reserved between two continuous data or signals in a ease that the length of the configured TTIs is longer than the threshold.

2. The apparatus according to claim 1, wherein, the circuitry is further operative to:
determine whether one or more reserved periods are reserved between the two continuous data or signals based on at least one of types of the two continuous data or signals or power difference between the two continuous data or signals.

3. The apparatus according to claim 2, wherein, the circuitry is further operative to:
determine that one or more reserved periods are reserved between the two continuous data or signals, if the types of the two continuous data or signals are different;
determine that one or more reserved periods are not reserved between the two continuous data or signals, if there is no power difference between the two continuous data or signals; or
determine that one or more reserved periods are not reserved between the two continuous data or signals, if the types of the two continuous data or signals are different and there is no power difference between the two continuous data or signals.

4. The apparatus according to claim 1, wherein, the circuitry is further operative to:
in a case that the one or more reserved periods are reserved between two continuous data or signals, not align Orthogonal Frequency Division Multiplexing (OFDM) or Single-carrier Frequency-Division Multiple Access (SC-FDMA) symbol boundary of each of the two continuous data or signals with that of other data or signals which have a length of TTI equaling to or longer than the threshold.

5. The apparatus according to claim 1, wherein, the circuitry is further operative to:
in a case that the one or more reserved periods are reserved between two data or signals, align OFDM or SC-FDMA symbol boundary of each of the two continuous data or signals with that of other data or signals which have a length of TTI equaling to or longer than the threshold.

6. The apparatus according to claim 5, wherein, the circuitry is further operative to:
reserve one OFDM or SC-FDMA symbol for the reserved period between the two continuous data or signals.

7. The apparatus according to claim 1, wherein, the transmitter is operative to:
in a case that one data or signal of the two continuous data or signals include a sounding reference signal (SRS), transmit user data in the one data or signal without transmitting a demodulation reference Signal (DMRS) in the one data or signal.

8. The apparatus according to claim 1, wherein, the circuitry is further operative to:
make an eNodeB (eNB) to indicate at least one of start time of at least one of the reserved periods or start time of at least one of data or signals.

9. The apparatus according to claim 1, wherein, the circuitry is further operative to:
reserve the reserved period which does not overlap with a reference signal (RS) symbol.

10. The apparatus according to claim 1, wherein the circuitry is further operative to perform at least one of the following steps, in a case that a length of each of the configured TTIs is shorter than or equal to a threshold:
setting the one or more reserved periods in which no wanted or desired data or signal is transmitted between continuous data or signals;
setting the one or more reserved periods in which no wanted or desired data or signal is transmitted before transmitting subsequent data or signals; or
setting the one or more reserved periods in which no wanted or desired data or signal is transmitted after transmitting subsequent data or signals.

11. The apparatus according to claim 10, wherein the wanted or desired data or signal is data or signal whose transmission power level is higher than a predetermined requirement.

12. The apparatus according to claim 1, wherein the two continuous data or signals include at least one of a sounding reference signal (SRS), a demodulation reference Signal (DMRS) of a TTI, or user data of a TTI.

13. The apparatus according to claim 1, wherein the configured TTIs includes at least one of a shortened TTI within a subframe or a TTI across one or more subframes.

14. A method, performed at a first node, comprising steps of:
transmitting, by a transmitter, wireless data or signals to a second node; and
determining whether one or more reserved periods are reserved between two continuous data or signals transmitted by the transmitter based on a length of configured transmission time intervals (TTIs),
wherein the step of determining further includes:
determining the one or more reserved periods are reserved between two continuous data or signals in a case that the length of the configured TTIs is shorter than or equal to a threshold, and
determining no reserved period is reserved between two continuous data or signals in a case that the length of the configured TTIs is longer than the threshold.

15. The method according to claim 14, wherein, the step of determining further includes:
determining whether one or more reserved periods are reserved between the two continuous data or signals based on at least one of types of the two continuous data or signals or power difference between the two continuous data or signals.

16. The method according to claim 15, wherein, the step of determining further includes:
determining that one or more reserved periods are reserved between the two continuous data or signals, if the types of the two continuous data or signals are different;

determining that one or more reserved periods are not reserved between the two continuous data or signals, if there is no power difference between the two continuous data or signals; or determining that one or more reserved periods are not reserved between the two continuous data or signals, if the types of the two continuous data or signals are different and there is no power difference between the two continuous data or signals.

17. The method according to claim 14, wherein, the step of determining further includes:

in a case that the one or more reserved periods are reserved between two continuous data or signals, a symbol of the two continuous data or signals is not aligned with that of other data or signals which have a length of TTI longer than or equal to the threshold.

18. The method according to claim 14, wherein, the step of transmitting further includes:

in a case that one data or signal of the two continuous data or signals include a sounding reference signal (SRS), transmit user data in one data or signal without transmitting a demodulation reference Signal (DMRS) in the one data or signal.

19. The method according to claim 14, wherein, the step of determining further includes:

reserving the reserved period which does not overlap with a reference signal (RS) symbol.

20. A communication system, performed at a first node, comprising one or more processors;

a memory coupled with the one or more processors, storing computer programs therein, when executed by the one or more processors, to perform steps of:

transmitting, by a transmitter, wireless data or signals to a second node; and determining whether one or more reserved periods are reserved between two continuous data or signals transmitted by the transmitter based on a length of configured transmission time intervals (TTIs), wherein the step of determining further includes:

determining the one or more reserved periods are reserved between two continuous data or signals in a case that the length of the configured TTIs is shorter than or equal to a threshold determining no reserved period is reserved between two continuous data or signals in a case that the length of the configured TTIs is longer than the threshold.

* * * * *